United States Patent
Kopecko

(10) Patent No.: US 11,820,599 B2
(45) Date of Patent: Nov. 21, 2023

(54) SYSTEM AND METHOD OF AUTOMATICALLY PICKING AND HANDLING PARTS

(71) Applicant: Caterpillar Inc., Peoria, IL (US)

(72) Inventor: Matthew Robert Kopecko, Spokane, WA (US)

(73) Assignee: Caterpillar Inc., Peoria, IL (US)

( * ) Notice: Subject to any disclaimer, the term of this patent is extended or adjusted under 35 U.S.C. 154(b) by 456 days.

(21) Appl. No.: 17/114,795

(22) Filed: Dec. 8, 2020

(65) Prior Publication Data

US 2022/0177231 A1 Jun. 9, 2022

(51) Int. Cl.
| | |
|---|---|
| *G06F 7/00* | (2006.01) |
| *B65G 1/137* | (2006.01) |
| *B23Q 7/16* | (2006.01) |
| *B25J 9/00* | (2006.01) |
| *B25J 9/16* | (2006.01) |

(52) U.S. Cl.
CPC ............ *B65G 1/1376* (2013.01); *B23Q 7/16* (2013.01); *B25J 9/0093* (2013.01); *B25J 9/1697* (2013.01)

(58) Field of Classification Search
CPC ........ B65G 1/1376; B23Q 7/16; B25J 9/0093; B25J 9/1697; B65B 5/045; B65B 5/067; B65B 35/16; B65B 57/14; B65B 57/20; G05B 2219/37572; G05B 2219/45048; G05B 19/4182
USPC ................................. 700/213–214, 228, 230
See application file for complete search history.

(56) References Cited

U.S. PATENT DOCUMENTS

| | | | |
|---|---|---|---|
| 9,600,798 B2 | 3/2017 | Battles et al. | |
| 9,834,380 B2 | 12/2017 | Hamilton et al. | |
| 10,471,597 B1 | 11/2019 | Murphy et al. | |
| 10,661,992 B2 | 5/2020 | Wicks et al. | |
| 2009/0320416 A1* | 12/2009 | Tischhauser | ............ B65B 57/20 53/473 |
| 2011/0243707 A1 | 10/2011 | Dumas et al. | |
| 2013/0253697 A1* | 9/2013 | Issing | .................. G06Q 10/087 700/214 |

(Continued)

FOREIGN PATENT DOCUMENTS

| | | |
|---|---|---|
| EP | 0749902 | 12/1996 |
| EP | 3418207 | 12/2018 |

*Primary Examiner* — Yolanda R Cumbess

(57) ABSTRACT

An automated parts handling system includes a conveyor, a robotic arm configured to pick parts from a parts receptacle and place the picked parts on the conveyor, a vision device disposed over or adjacent the conveyor and configured to determine the number of parts picked by the robotic arm from the parts receptacle and placed on the conveyor, a memory, and a processor communicatively coupled to the conveyor, the robotic arm, and the vision device. The memory includes program instructions executable by the processor to implement a pick process configured to receive information from the vision device on the number of parts picked by the robotic arm and placed on the conveyor, based on the received information regarding the number of picked parts, selectively control the robotic arm to retrieve from the conveyor a number of the picked parts, and selectively control the robotic arm to place one or more of the retrieved parts back in the parts receptacle when the number of parts picked by the robotic arm differs from a predetermined number of parts specified in the program instructions.

20 Claims, 2 Drawing Sheets

(56) References Cited

U.S. PATENT DOCUMENTS

2015/0352721 A1* 12/2015 Wicks .................... G06V 20/10
  700/228
2017/0225330 A1   8/2017 Wagner et al.

* cited by examiner

SYSTEM AND METHOD OF AUTOMATICALLY PICKING AND HANDLING PARTS

TECHNICAL FIELD

The present disclosure is directed to a system and method for the automatic picking and handling of parts, and, more particularly, a system and method for the automatic picking, checking, and packaging of parts for distribution to customers.

BACKGROUND

A manufacturer of parts, such as machine parts for heavy equipment, ground engagement tools used on earth moving machinery, and other products manufactured using various subtractive and/or additive methods of manufacturing, may use electronic marketplaces, such as those accessible via the Internet, including catalogs of items or products available for purchase. These items may be offered as repair or replacement parts for existing equipment, on a one time basis, or on a recurring basis, such as by subscription or according to on-demand protocols. The parts may be offered directly to customers who are end users of the heavy equipment, or to intermediaries, such as dealerships for the heavy equipment, with the dealerships then supplying required parts to the end users at other remote locations. In one example, customers, such as an end consumer at a remote mine site or other work location, or a dealership for heavy equipment, may utilize a web browser to visit a website operated by the manufacturer or by a dealership for the equipment supplied by the manufacturer, select an item for purchase from a catalog, and engage in a checkout process to finalize an order for the item. The manufacturer may operate a fulfillment network including various facilities in order to process such orders. For instance, the manufacturer may operate a facility that prepares shipments of purchased items. A shipment carrier may acquire such shipments from the manufacturer and deliver the shipments to respective dealerships or directly to purchasing customers.

The facilities operated by the manufacturer may include one or more automated parts picking and handling stations configured to implement various fulfillment processes for automated fulfillment of orders submitted by customers. These processes may operate on items to perform various tasks, such as preparing items for shipment. At one or more points in these processes, items may be physically picked up from one location, for example, from a parts receptacle such as a tote, and placed at another location, such as on a conveyor belt or into a sorting bin or a shipment box. A need exists for an automated parts picking and handling system and method for implementation in a materials handling facility operated by a manufacturer, wherein the system and method is capable of reliably and adaptively picking up the proper number of items of various types such as items having various shapes, sizes, and weights, checking the quantity and other aspects of the picked parts, packaging and labeling the picked parts, and placing the picked parts into shipping containers.

One example of an automated materials handling facility is shown in U.S. Pat. No. 9,600,798, which generally shows a facility using a series of automated devices, such as automated guidance vehicles, mobile drive units, robotic arms, automated sorters, etc., to facilitate item receiving, stowing, picking, shipping and other aspects of materials handling. However, the disclosed system and method fails to include any means for determining that the proper number of parts has been picked at any particular picking station, and also lacks the ability to pack multiple orders of parts that are ultimately destined to go to different end locations in a single package or multiple packages for initial distribution to a dealership and then later distribution to one or more different end locations.

The system and method of automatically picking, checking, and packing parts as set forth in the present disclosure solves one or more of the problems set forth above and/or other problems of the prior art.

SUMMARY

In one aspect, the present disclosure is directed to an automated part picking and handling system. The system may include a conveyor, a first robotic arm configured to pick parts from a parts receptacle and place the picked parts on the conveyor, a first vision device disposed over or adjacent the conveyor and configured to determine the number of parts picked by the first robotic arm from the parts receptacle and placed on the conveyor, and an automated packing and labeling machine configured to receive the parts picked by the first robotic arm and conveyed to the automated packing and labeling machine by the conveyor, package the picked parts, print a label with information associated with the packaged parts, and place the label on the package for the parts. The system may also include a second robotic arm configured to pick the package of parts from the conveyor and place the package in a shipping container. The system may still further include a memory, and one or more processors communicatively coupled to the conveyor, the first and second robotic arms, the first vision device, the automated packing and labeling machine and the memory, wherein the memory comprises program instructions executable by the one or more processors to implement a pick process configured to: (a) receive information from the first vision device on the number of parts picked by the first robotic arm and placed on the conveyor; (b) based on the received information regarding the number of picked parts, selectively control the first robotic arm to retrieve from the conveyor a number of the picked parts; and (c) selectively control the first robotic arm to place one or more of the retrieved parts back in the parts receptacle when the number of parts picked by the first robotic arm differs from a predetermined number of parts specified in the program instructions.

In another aspect, the present disclosure is directed to an automatic parts handling system. The automatic parts handling system may include a conveyor, a first robotic arm configured to pick parts from a parts receptacle and place the picked parts on the conveyor, and a first vision device disposed over or adjacent the conveyor and configured to determine the number of parts picked by the first robotic arm from the parts receptacle and placed on the conveyor. The system may also include a memory, and one or more processors communicatively coupled to the conveyor, the first robotic arm, and the first vision device, wherein the memory comprises program instructions executable by the one or more processors to implement a pick process configured to: (a) receive information from the first vision device on the number of parts picked by the first robotic arm and placed on the conveyor; (b) based on the received information regarding the number of picked parts, selectively control the first robotic arm to retrieve from the conveyor a number of the picked parts; and (c) selectively control the first robotic arm to place one or more of the retrieved parts back in the parts receptacle when the number of parts picked by the first robotic arm differs from a predetermined number of parts specified in the program instructions.

In yet another aspect, the present disclosure is directed to a method of picking and checking parts using an automated parts handling system. The automated parts handling system may include a conveyor, a first robotic arm configured to pick parts from a parts receptacle and place the picked parts on the conveyor, a first vision device disposed over or adjacent the conveyor and configured to determine the number of parts picked by the first robotic arm from the parts receptacle and placed on the conveyor, an automated packing and labeling machine configured to receive the parts picked by the first robotic arm and conveyed to the automated packing and labeling machine by the conveyor, package the picked parts, print a label with information associated with the packaged parts, and place the label on the package for the parts, a second robotic arm configured to pick the package of parts from the conveyor and place the package in a shipping container, a memory, and one or more processors communicatively coupled to the conveyor, the first and second robotic arms, the first vision device, the automated packing and labeling machine and the memory. The method may include implementing a pick process using the one or more processors executing program instructions stored in the memory, including: (a) receiving information from the first vision device on the number of parts picked by the first robotic arm and placed on the conveyor; (b) based on the received information regarding the number of picked parts, selectively controlling the first robotic arm to retrieve from the conveyor a number of the picked parts; and (c) selectively control the first robotic arm to place one or more of the retrieved parts back in the parts receptacle when the number of parts picked by the first robotic arm differs from a predetermined number of parts specified in the program instructions.

DETAILED DESCRIPTION

Figure 1:
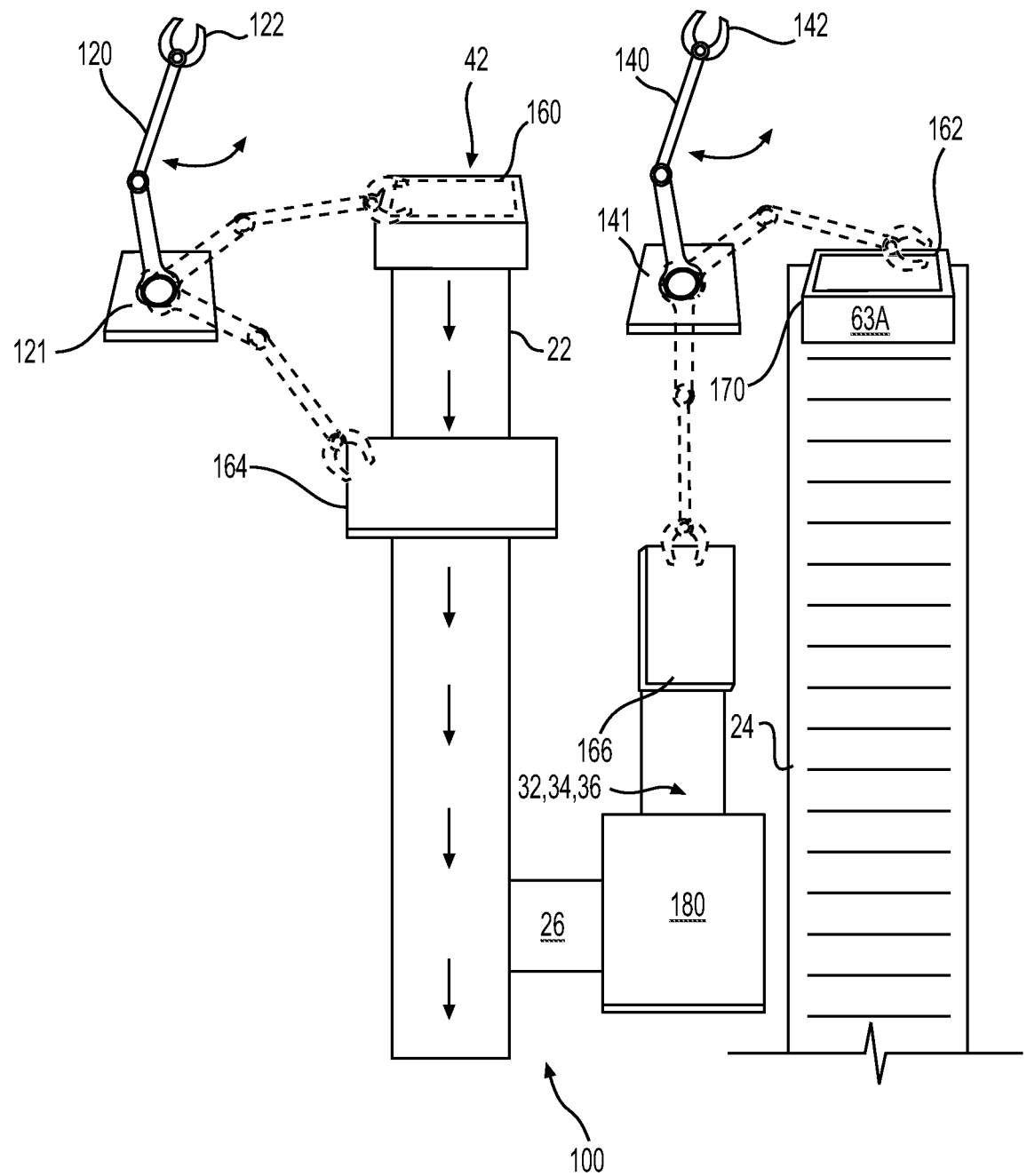
FIG. 1 illustrates an exemplary automated part picking and handling station.

FIG. 1 illustrates an exemplary automated part picking and handling station 100 configured with a first robotic arm 120 for picking parts from various parts receptacles, such as standardized totes or containers used in conjunction with an automated storage and retrieval system (e.g., an AutoStore™ automated storage and retrieval system), one or more vision devices for checking that the number of picked parts is correct, one or more conveyors for conveying the picked parts to an automated packing and labeling machine 180, and additional conveyors for further conveying the packaged parts to another checking station with one or more vision devices. The automated part picking and handling station 100 may further include a second robotic arm 140 configured for retrieving packaged parts from a conveyor 36 after automated packing and labeling machine 180 packages the parts, prints a label for each package of parts, and affixes the label to the package. Second robotic arm 140 may be configured to retrieve the packages of parts from conveyor 36 and place the packaged parts into a shipping container 170. In various embodiments according to this disclosure, a fulfillment network may include multiple automated part picking and handling stations (each of which may be configured in a manner similar to that of automated part picking and handling station 100 of FIG. 1) with each of the picking and handling stations being responsible for fulfilling multiple orders, such as orders placed through an electronic commerce ("e-commerce") portal.

As shown in FIG. 1, an automated part picking and handling system according to an exemplary embodiment of this disclosure may include one or more automated part picking and handling stations 100, which each may include one or more conveyors 22, 24, 32, 34, 36, configured for moving parts between various locations where different automated part handling functions are performed. A first robotic arm 120 with a proximal base 121 relative to which first robotic arm 120 may pivot or rotate, and a distal part gripping attachment 122, may be configured to pick parts from a parts receptacle (not shown) and place the picked parts at a first end 42 of one of the conveyors 22. A first vision device 160, 164 may be disposed over or adjacent to conveyor 22 and configured to determine the number of parts picked by first robotic arm 120 from the parts receptacle and placed on conveyor 22. First vision device 160, 164 may include, for example, a vision hood 160 positioned over conveyor 22 at a location where first robotic arm 120 places the picked parts on conveyor 22, and one or more cameras 164 or other optical sensing devices positioned over or adjacent conveyor 22 at one or more positions downstream from first end 42 of conveyor 22 at one or more locations where first robotic arm 120 is configured to be capable of retrieving one or more of the picked parts on conveyor 22. Alternative implementations may include only a single vision device such as vision hood 160 disposed over or adjacent to first end 42 of conveyor 22 at a position where first robotic arm 120 places parts picked from a parts receptacle. Still further implementations may include multiple cameras 164 or other vision devices or optical or proximity sensors disposed at various positions along conveyor 22, and configured to identify the number of parts moving along conveyor 22, as well as other characteristics of the parts. In some embodiments, cameras and other vision devices may operate in conjunction with machine learning software in order to perform various inspections on the parts moving along conveyor 22, such as determining whether a picked part is the correct part, and whether a picked part has any defects.

First vision device 160, 164 may include one or more vision hoods, cameras, and/or other optical sensors positioned above or adjacent conveyor 22 such that parts being moved by conveyor 22 pass by the one or more vision devices at a rate of speed and distance within the detection capabilities of the various vision devices. For example, a vision device configured to simply count the number of parts placed on conveyor 22 by first robotic arm 120 may be disposed along a section of conveyor 22 that moves at a first rate of speed, while additional vision devices configured to perform more extensive inspections such as determining whether a picked part is a correct part, or whether a part has any defects that can be visually identified, may be disposed along a section of conveyor 22 that moves at a second rate of speed slower than the first rate of speed.

As shown in FIG. 1, one or more parts picked by first robotic arm 120 from a parts receptacle and placed at one end 42 of conveyor 22 may be moved along conveyor 22, past first vision devices 160, 164, and in some circumstances may be retrieved by first robotic arm 120 from conveyor 22 at or downstream from the location of a vision device (e.g., one or more cameras 164), to be returned to the parts receptacle. The circumstances that may result in retrieval of parts from conveyor 22, to be discussed below in more detail, may include an identification by a vision device that the number of parts picked by first robotic arm 120 is not correct, or that one or more parts are not the correct part, or have unacceptable defects. After having passed all desired inspections, parts on conveyor 22 may be moved to a position where a push feeder 26 is configured to move the parts from conveyor 22 into automated packing and labeling machine 180. Automated packing and labeling machine 180 may be configured to receive the parts pushed by push feeder 26 from conveyor 22, package the parts, print a label with information associated with the packaged parts, and place the label on the package for the parts.

After parts are packaged and the packages are labeled by automated packing and labeling machine 180, the packages of parts may then be moved by one or more additional conveyors 32, 34, 36, along any desired pathway or in accordance with other handling parameters to another position within range of second robotic arm 140. Second robotic arm 140, with a proximal base 141 relative to which second robotic arm 140 may pivot or rotate, and equipped with a part gripping attachment 142, may be configured to retrieve each package of parts from conveyor 36 and place each package into a shipping container 170 located on yet another conveyor 24. A second vision device 166 may be disposed over conveyor 36 in a position where second robotic arm 140 is configured to pick the package of parts from the conveyor, the second vision device being configured to generate a signal indicative of the position and orientation of the package of parts on the conveyor. Second vision device 166 may be configured to provide information used by second robotic arm 140 and part gripping attachment 142 such that the exact location of each package of parts and the size, orientation, and configuration of each package is known for guiding operation of second robotic arm 140. Additionally, automated part picking and handling station 100 may include a third vision device 162 disposed over or adjacent shipping container 170 on another conveyor 24. Third vision device 162 may be configured to provide information on where to place each package of parts in shipping container 170 for the most efficient arrangement of packages of parts in shipping container 170 and to avoid over packing of the shipping container.

Automated part picking and handling station 100 may include a control unit located in close proximity to the station or remotely and in wired or wireless communication with various sensors and control devices, such as solenoids, motors, pumps, and actuators. The control unit associated with automated part picking and handling station 100 may include one or more memories, and one or more processors communicatively coupled to conveyors 22, 24, 32, 34, 36, first and second robotic arms 120, 140, vision devices 160, 162, 164, 166, automated packing and labeling machine 180, and the one or more memories. A memory associated with the control unit may include program instructions executable by the one or more processors to implement a pick process. In various exemplary implementations of this disclosure, the pick process may be configured to: (a) receive information from first vision device 160, 164 on the number of parts picked by first robotic arm 120 and placed on conveyor 22; (b) based on the received information regarding the number of picked parts, selectively control first robotic arm 120 to retrieve from conveyor 22 a number of the picked parts; and (c) selectively control first robotic arm 120 to place one or more of the retrieved parts back in the parts receptacle when the number of parts picked by first robotic arm 120 differs from a predetermined number of parts specified in the program instructions. One of ordinary skill in the art will recognize that the one or more memories may include instructions that, when executed by the one or more processors, cause first robotic arm 120 to only retrieve parts to be returned to the parts receptacle after having made a determination on whether the number of parts picked and placed on the conveyor is inconsistent with a predetermined number of parts included in the instructions.

Automated part picking and handling station 100 may further include second vision device 166 disposed over conveyor 36 in a position where second robotic arm 140 is configured to pick the package of parts from conveyor 36. Second vision device 166 may be configured to generate a signal indicative of the precise position, configuration, and orientation of the package of parts on conveyor 36, thus assisting second robotic arm 140 and gripping attachment 142 in rapidly locating and picking each package of parts from conveyor 36 for transfer into a shipping container 170. Additionally, automated part picking and handling station 100 may include a third vision device 162 disposed over shipping container 170 on another conveyor 24. Third vision device 162 may be configured to provide information on where to place each package of parts in shipping container 170 for the most efficient arrangement of packages of parts in shipping container 170 and to avoid over packing of the shipping container.

The pick process implemented by the one or more processors executing program instructions stored in memory may include controlling first robotic arm 120 to rotate or pivot about proximal base 121, and controlling gripping attachment 122 at a distal end of first robotic arm 120 to retrieve all of the picked parts placed on conveyor 22 by first robotic arm 120 and place all of the retrieved parts back in the parts receptacle when the detected number of picked parts on the conveyor exceeds the predetermined number of parts specified in the program instructions. In other alternative implementations, the instructions stored in memory may result in the one or more processors controlling first robotic arm 120 to retrieve all of the picked parts placed on conveyor 22 by first robotic arm 120 and place all of the retrieved parts back in the parts receptacle when the number of picked parts is greater than one. In still further alternative implementations, the instructions stored in memory may result in the one or more processors controlling first robotic arm 120 to retrieve a number of the picked parts placed on conveyor 22 by first robotic arm 120 when the detected number of picked parts on the conveyor exceeds the predetermined number of parts and place only the retrieved parts in excess of the predetermined number of parts back in the parts receptacle.

Automated part picking and handling system 100 may include first vision device 160, 164, wherein first vision device 160, 164 may include vision hood 160 positioned over or adjacent the first end 42 of conveyor 22 at a location where first robotic arm 120 and gripping attachment 122 places the picked parts on conveyor 22, and one or more cameras 164 positioned over or adjacent conveyor 22 at a position downstream from where first robotic arm 120 places the picked parts on the conveyor. Automated part picking and handling system 100 may still further include push feeding mechanism 26 disposed above conveyor 22 adjacent automated packing and labeling machine 180 and configured to be operated by the one or more processors to accumulate a predetermined number of parts being moved along the conveyor before moving the predetermined number of parts into automated packing and labeling machine 180 for packaging and labeling. The one or more processors executing program instructions stored in memory may be configured to operate push feeding mechanism 26 such that different types of parts being conveyed along conveyor 22 are pushed from conveyor 22 into different entry points or receptacles of automated packing and labeling machine 180, or are grouped according to other part characteristics before being pushed into automated packing and labeling machine 180.

Automated part picking and handling system 100 may also include one or more memories further comprising program instructions executable by the one or more processors to implement a pick process further configured to: (d) control first robotic arm 120 to selectively pick parts from one or more parts receptacles to be packaged and labeled by automated packing and labeling machine 180, wherein the parts to be packaged in a single package are intended for an ultimate destination different from an initial destination for the shipping container. This feature of the system enables the selection and packaging of parts that will ultimately be sent from a first destination, such as a machinery dealer, to a final destination, such as a remote mine site or other location where an end customer has ordered the parts. An exemplary implementation of a picking and handling method that may be performed by automated part picking and handling system 100 will be described in the following section.

INDUSTRIAL APPLICABILITY

A method of picking and checking parts according to various implementations of this disclosure may employ an automated parts picking and handling system 100. Automated parts picking and handling system 100 may include one or more conveyors 22, 24, 32, 34, 36, a first robotic arm 120 configured to pick parts from a parts receptacle and place the picked parts on a conveyor of the one or more conveyors, and a first vision device 160, 164 disposed over conveyor 22 and configured to determine the number of parts picked by first robotic arm 120 from the parts receptacle and placed on the conveyor. Automated packing and labeling machine 180 may be configured to receive the parts picked by first robotic arm 120 and conveyed to automated packing and labeling machine 180 by conveyor 22, package the picked parts, print a label with information associated with the picked and packaged parts, and place the printed label on a package of parts.

Figure 2:
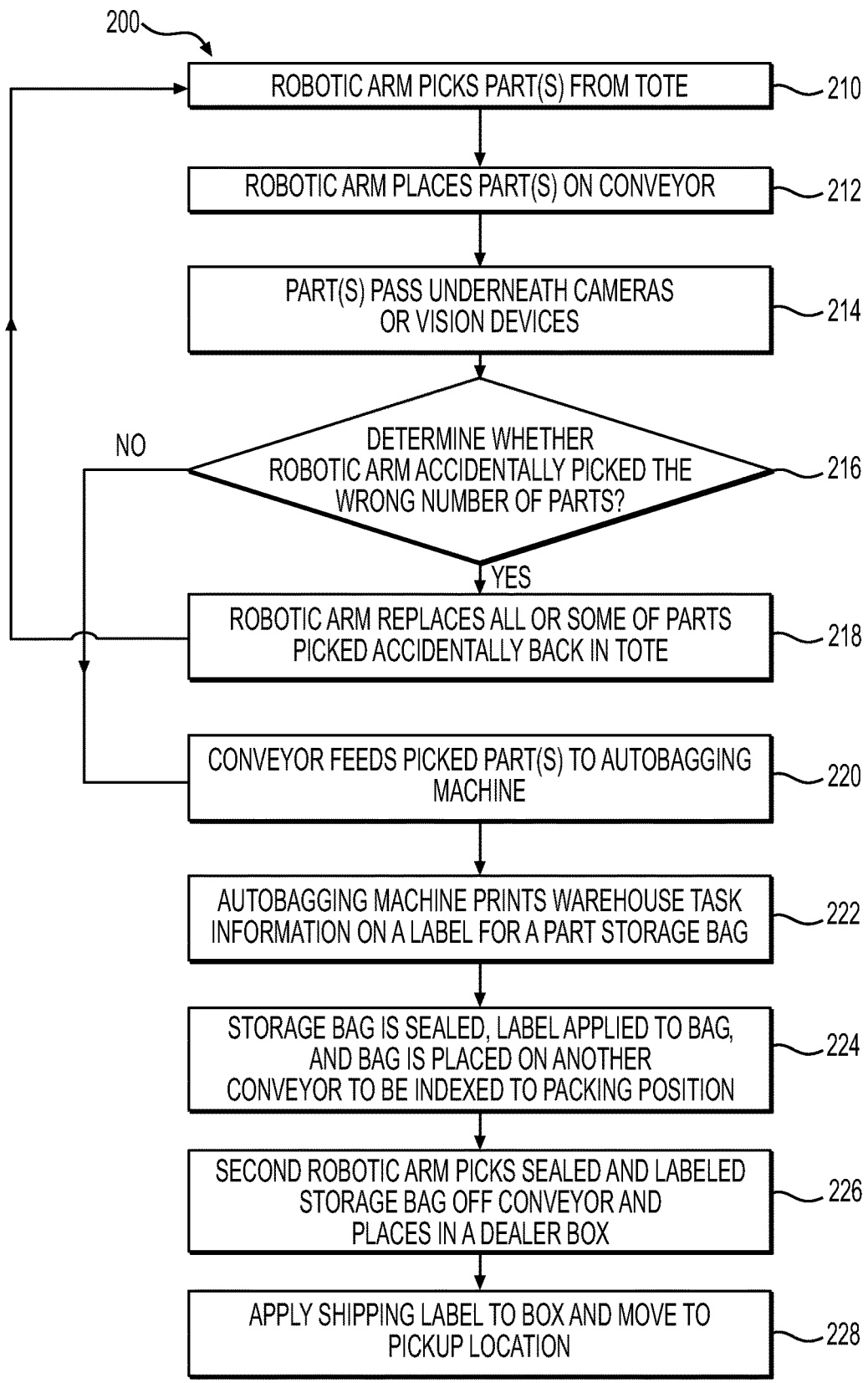
FIG. 2 is a flow chart illustrating an exemplary method performed by the automated part picking and handling station of FIG. 1.

In one exemplary implementation of this disclosure shown in the flow chart of FIG. 2, a method 200 may include first robotic arm 120 picking one or more parts from a parts receptacle such as a tote in step 210. First robotic arm 120 may then place the picked part(s) on conveyor 22 at step 212. The picked parts may then pass underneath or adjacent one or more vision devices, cameras, or other optical sensors at step 214. One or more processors of a control unit executing pick process instructions retrieved from one or more memories may then receive signals from the one or more vision devices and determine whether first robotic arm 120 accidentally picked an incorrect number of parts at step 216.

As shown in FIG. 2, if a determination is made that first robotic arm 120 picked an incorrect number of parts from the parts receptacle (step 216: Yes) then first robotic arm 120 may receive instructions to retrieve some or all of the parts that were placed on the conveyor and place them back in the parts receptacle at step 218 in order to begin the process of picking and checking parts all over again at step 210 every time the number of picked parts is not consistent with the predetermined number of parts. However, if a determination is made that first robotic arm 120 picked the correct number of parts from the parts receptacle (step 216: No) then the picked parts are conveyed along conveyor 22 to automated packaging and labeling machine (autobagging machine) 180 at step 220.

At step 222, autobagging machine 180 may print warehouse task information or other information associated with the parts that are being packaged onto a label for a part storage bag. Autobagging machine 180 may then seal the parts in a storage bag, label the storage bag with the printed label, and place the bag on another conveyor(s) 32, 34, 36, to be indexed to a packing position at step 224. As shown in the schematic representation of an exemplary automated part picking and handling station 100 in FIG. 1 and the exemplary method of FIG. 2, second robotic arm 140 may retrieve a sealed and labeled package of parts from an end of conveyor 36 to transfer the package into a shipping container 170 at step 226. Finally, a shipping label may be applied to shipping container 170 after it is filled, and shipping container 170 may be moved to a pickup location at step 228.

In another alternative implementation of a method of picking and checking parts, the method may include controlling first robotic arm 120 to retrieve all of the picked parts placed on conveyor 22 by first robotic arm 120, and place all of the retrieved parts back in the parts receptacle when the number of picked parts is greater than one. In this implementation, the program instructions for operating first robotic arm 120 may specify that only a single part is to be picked from the parts receptacle each time, such that any indication that more than one part was picked and placed on conveyor 22 will be recognized as an error in parts handling, resulting in immediate instructions to place all of the picked parts back in the parts receptacle. Each time an error occurs in parts handling according to this implementation, first robotic arm 120 may return all of the picked parts on conveyor 22 to the original parts receptacle or to another intermediary parts receptacle, and repeat the process in order to attempt to pick only a single part.

In yet another alternative implementation of a method of picking and checking parts according to this disclosure, one or more processors executing program instructions stored in one or more memories may control first robotic arm 120 to retrieve a number of the picked parts placed on conveyor 22 by first robotic arm 120 in excess of the predetermined number of parts, and place the retrieved parts back in the parts receptacle. In this implementation, program instructions may also specify the number of parts expected during a predetermined period of time, and/or along a predetermined section of conveyor 22 during a continuous process of picking parts from one or more parts receptacles using first robotic arm 120, moving the picked parts along conveyor 22, and pushing the picked parts from conveyor 22 into automated packing and labeling machine 180. The one or more processors executing program instructions according to this implementation may be further configured to adjust the number of expected parts during a particular period of time or along a predetermined section of conveyor 22, according to customer requirements.

A control system associated with automated parts picking and handling system 100 may include, but is not limited to, one or more computer systems, one or more data storage devices, one or more wired and/or wireless networks, control system software (programs, modules, drivers, user interfaces, etc.), one or more vision devices such as vision hoods and cameras or other optical sensors, one or more hand-held, mobile and/or fixed readers, scanners or scanning devices that may be able to scan, receive, or otherwise detect the marks or tags (e.g., bar codes, RFID tags, etc.) on individual items or products and/or individual sections (locations) of the conveyors 22, 24, 32, 34, 36. If required, the ID of a particular product or part may be obtained by any suitable ID sensor (e.g., a bar code reader, an RFID device) reading an ID tag (e.g., a bar code tag, an RFID tag, or some other scannable or readable mechanism, mark, or tag) attached to the product or part. For example, items may be marked or tagged with a bar code, Universal Product Code (UPC), Stock-Keeping Unit (SKU) code, serial number, and/or other designation (including proprietary designations) that may be used as item identifiers. The item IDs may identify items by type, and/or may identify individual items within a type of item. The ID sensor for this purpose may form or be part of an optical sensor, or may be provided separately from such a sensor when, for example, the optical sensor is a 3D image sensor. The exact location of a part on a conveyor may also be obtained by attaching a location ID tag to each segment/section of the conveyor belt and reading the location ID tag with a suitable location ID sensor, which is included in the control system. Other means, such as a rotary encoder coupled to a shaft of the conveyor, may also be used to determine the location of a part relative to the conveyor. The item ID and the conveyor location ID may be communicated to the control system via wired and/or wireless communications. The control system may correlate the sensed information of each part, the ID of the part, and the location of the part on the conveyor with each other. The control system may then reference the correlated information against program instructions executed by one or more processors during the part picking and checking processes performed by various implementations of this disclosure.

Various embodiments of the systems and methods for automatically picking and checking parts in an automated parts picking and handling system, as described herein, may be executed on one or more computer systems, which may interact with various other devices. Note that any component, action, or functionality described above with respect to FIGS. 1 and 2 may be implemented via one or more computer systems according to various embodiments. An exemplary computer system may include one or more processors coupled to one or more system memories via an input/output (I/O) interface. The methods described herein may be implemented in software, hardware, or a combination thereof, in different embodiments. Various modifications and changes may be made as would be obvious to a person skilled in the art having the benefit of this disclosure. The various embodiments described herein are meant to be illustrative and not limiting. Many variations, modifications, additions, and improvements are possible.

It will be apparent to those skilled in the art that various modifications and variations can be made in the disclosed automated parts picking and handling system without departing from the scope of the disclosure. Other embodiments of the disclosed system and method will be apparent to those skilled in the art from consideration of the specification. It is intended that the specification and examples be considered as exemplary only, with a true scope of the disclosure being indicated by the following claims and their equivalents.

What is claimed is:

1. An automated part picking and handling system, comprising:
    a conveyor;
    a first robotic arm configured to pick parts from a parts receptacle and place the picked parts on the conveyor;
    a first vision device disposed over or adjacent the conveyor and configured to determine the number of parts picked by the first robotic arm from the parts receptacle and placed on the conveyor;
    an autobagging machine configured to receive the parts picked by the first robotic arm and conveyed to the autobagging machine by the conveyor, package the picked parts, print a label with information associated with the packaged parts, and place the label on the package for the parts;
    a second robotic arm configured to pick the package of parts from the conveyor and place the package in a shipping container;
    a memory; and
    one or more processors communicatively coupled to the conveyor, the first and second robotic arms, the first vision device, the autobagging machine and the memory, wherein the memory comprises program instructions executable by the one or more processors to implement a pick process configured to: (a) receive information from the first vision device on the number of parts picked by the first robotic arm and placed on the conveyor; (b) based on the received information regarding the number of picked parts, selectively control the first robotic arm to retrieve from the conveyor a number of the picked parts; and (c) selectively control the first robotic arm to place one or more of the retrieved parts back in the parts receptacle when the number of parts picked by the first robotic arm differs from a predetermined number of parts specified in the program instructions.

2. The automated part picking and handling system of claim 1, further including a second vision device disposed over or adjacent the conveyor in a position where the second robotic arm is configured to pick the package of parts from the conveyor, the second vision device being configured to generate a signal indicative of the position of the package of parts on the conveyor.

3. The automated part picking and handling system according to claim 1, further including a third vision device disposed over or adjacent the shipping container and configured to provide information on where to place the package of parts in the shipping container for the most efficient arrangement of packages of parts in the shipping container and to avoid over packing of the shipping container.

4. The automated part picking and handling system of claim 1, wherein the pick process implemented by the one or more processors includes controlling the first robotic arm to retrieve all of the picked parts placed on the conveyor by the first robotic arm and place all of the retrieved parts back in the parts receptacle when the number of picked parts exceeds the predetermined number of parts.

5. The automated part picking and handling system of claim 1, wherein the pick process implemented by the one or more processors includes controlling the first robotic arm to retrieve all of the picked parts placed on the conveyor by the first robotic arm and place all of the retrieved parts back in the parts receptacle when the number of picked parts is greater than one.

6. The automated part picking and handling system of claim 1, wherein the pick process implemented by the one or more processors includes controlling the first robotic arm to retrieve a number of the picked parts placed on the conveyor by the first robotic arm in excess of the predetermined number of parts and place the retrieved parts back in the parts receptacle.

7. The automated part picking and handling system of claim 1, wherein the first vision device includes a vision hood positioned over the conveyor at a location where the first robotic arm places the picked parts on the conveyor, and one or more cameras positioned over the conveyor at a position downstream from where the first robotic arm places the picked parts on the conveyor.

8. The automated part picking and handling system of claim 1, further including a push feeding mechanism disposed above the conveyor adjacent the autobagging machine and configured to be operated by the one or more processors to accumulate a predetermined number of parts being moved along the conveyor before moving the predetermined number of parts into the autobagging machine for packaging and labeling.

9. The automated part picking and handling system of claim 1, wherein the memory further comprises program instructions executable by the one or more processors to implement a pick process further configured to: (d) control the first robotic arm to pick parts from the parts receptacle to be packaged by the autobagging machine, wherein the parts to be packaged in a single package by the autobagging machine are intended for an ultimate destination different from an initial destination for the shipping container.

10. An automated parts handling system, comprising:
a conveyor;
a first robotic arm configured to pick parts from a parts receptacle and place the picked parts on the conveyor;
a first vision device disposed over or adjacent the conveyor and configured to determine the number of parts picked by the first robotic arm from the parts receptacle and placed on the conveyor;
a memory; and
one or more processors communicatively coupled to the conveyor, the first robotic arm, and the first vision device, wherein the memory comprises program instructions executable by the one or more processors to implement a pick process configured to: (a) receive information from the first vision device on the number of parts picked by the first robotic arm and placed on the conveyor; (b) based on the received information regarding the number of picked parts, selectively control the first robotic arm to retrieve from the conveyor a number of the picked parts; and (c) selectively control the first robotic arm to place one or more of the retrieved parts back in the parts receptacle when the number of parts picked by the first robotic arm differs from a predetermined number of parts specified in the program instructions.

11. The automated parts handling system of claim 10, further including:
an autobagging machine configured to receive the parts picked by the first robotic arm and conveyed to the autobagging machine by the conveyor, package the picked parts, print a label with information associated with the bagged parts, and place the label on the package for the parts;
a second robotic arm configured to pick the package of parts from the conveyor and place the package in a shipping container; and
a second vision device disposed over or adjacent the conveyor in a position where the second robotic arm is configured to pick the package of parts from the conveyor, the second vision device being configured to generate a signal indicative of the position of the package of parts on the conveyor.

12. The automated parts handling system according to claim 11, further including a third vision device disposed over or adjacent the shipping container and configured to provide information on where to place the package of parts in the shipping container for the most efficient arrangement of packages of parts in the shipping container and to avoid over packing of the shipping container.

13. The automated parts handling system of claim 10, wherein the pick process implemented by the one or more processors includes controlling the first robotic arm to retrieve all of the picked parts placed on the conveyor by the first robotic arm and place all of the retrieved parts back in the parts receptacle when the number of picked parts exceeds the predetermined number of parts.

14. The automated parts handling system of claim 10, wherein the pick process implemented by the one or more processors includes controlling the first robotic arm to retrieve all of the picked parts placed on the conveyor by the first robotic arm and place all of the retrieved parts back in the parts receptacle when the number of picked parts is greater than one.

15. The automated parts handling system of claim 10, wherein the pick process implemented by the one or more processors includes controlling the first robotic arm to retrieve a number of the picked parts placed on the conveyor by the first robotic arm in excess of the predetermined number of parts and place the retrieved parts back in the parts receptacle.

16. The automated parts handling system of claim 10, wherein the first vision device includes a vision hood positioned over the conveyor at a location where the first robotic arm places the picked parts on the conveyor, and one or more cameras positioned over the conveyor at a position downstream from where the first robotic arm places the picked parts on the conveyor.

17. A method of picking and checking parts using an automated parts handling system that includes:
a conveyor,
a first robotic arm configured to pick parts from a parts receptacle and place the picked parts on the conveyor,
a first vision device disposed over or adjacent the conveyor and configured to determine the number of parts picked by the first robotic arm from the parts receptacle and placed on the conveyor,
an autobagging machine configured to receive the parts picked by the first robotic arm and conveyed to the autobagging machine by the conveyor, package the picked parts, print a label with information associated with the packaged parts, and place the label on the package for the parts,
a second robotic arm configured to pick the package of parts from the conveyor and place the package in a shipping container,
a memory, and
one or more processors communicatively coupled to the conveyor, the first and second robotic arms, the first vision device, the autobagging machine and the memory, the method comprising:
implementing a pick process using the one or more processors executing program instructions stored in the memory, including:
(a) receiving information from the first vision device on the number of parts picked by the first robotic arm and placed on the conveyor;

(b) based on the received information regarding the number of picked parts, selectively controlling the first robotic arm to retrieve from the conveyor a number of the picked parts; and (c) selectively controlling the first robotic arm to place one or more of the retrieved parts back in the parts receptacle when the number of parts picked by the first robotic arm differs from a predetermined number of parts specified in the program instructions.

18. The method of claim 17, further comprising:

controlling the first robotic arm to retrieve all of the picked parts placed on the conveyor by the first robotic arm; and placing all of the retrieved parts back in the parts receptacle when the number of picked parts exceeds the predetermined number of parts.

19. The method of claim 17, further comprising:

controlling the first robotic arm to retrieve all of the picked parts placed on the conveyor by the first robotic arm; and placing all of the retrieved parts back in the parts receptacle when the number of picked parts is greater than one.

20. The method of claim 17, further comprising:

controlling the first robotic arm to retrieve a number of the picked parts placed on the conveyor by the first robotic arm in excess of the predetermined number of parts; and placing the retrieved parts back in the parts receptacle.

\* \* \* \* \*